Feb. 6, 1962 W. W. CUSHMAN 3,019,885
MOTIVE POWERED OR GRAVITY BEARINGLESS CONVEYOR
Filed July 22, 1960
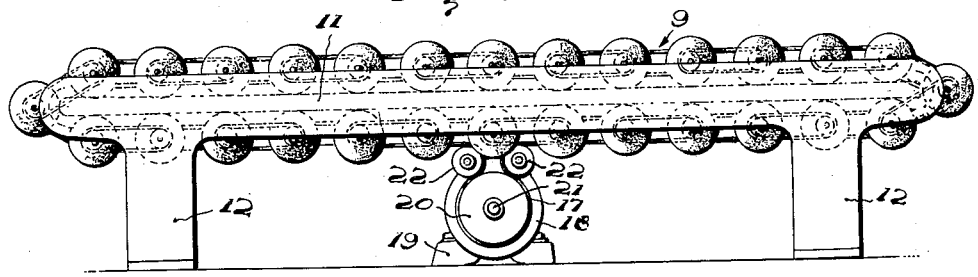
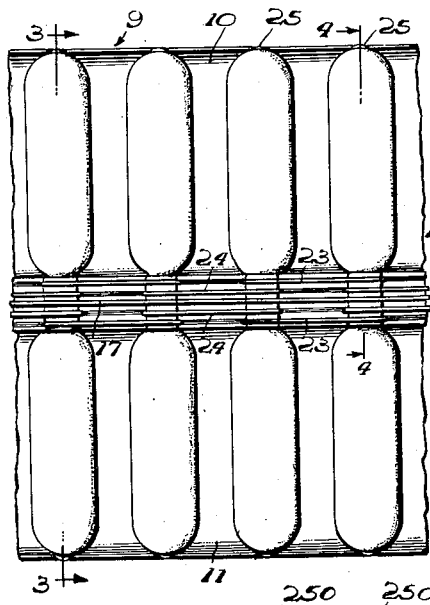
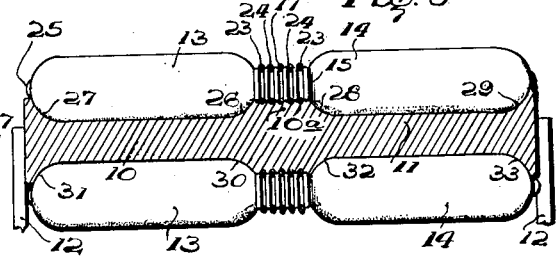
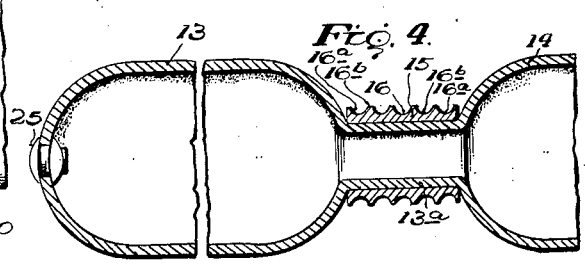
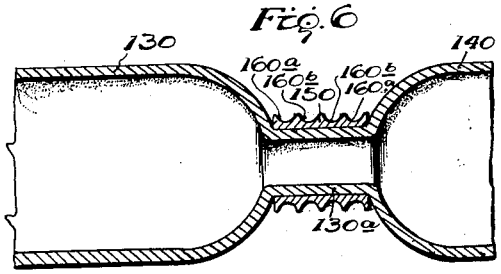
INVENTOR
Walton W. Cushman
BY
ATTORNEY 3,019,885
MOTIVE POWERED OR GRAVITY BEARINGLESS CONVEYOR
Walton W. Cushman, Webb City, Mo.
(6428 Lumar Drive SE., Washington, D.C.)
Filed July 22, 1960, Ser. No. 44,825
11 Claims. (Cl. 198—127)
(Granted under Title 35, U.S. Code (1952), sec. 266)

The invention described herein, if patented, may be manufactured and used by or for the Government for governmental purposes, without the payment to me of any royalty thereon.

The present invention relates to a motive-powered or gravity bearingless roller conveyor structure. It has to do with such a structure in which the roller elements are non-metallic and preferably inflatable, and in which costly and service-requiring lubricated bearings, standard equipment on conventional conveyor structures, are entirely dispensed with.

Important objects of the invention, among others, are:
(1) Silent operation;
(2) Elimination of costly conventional bearings, which require lubrication by grease-packing, and thus the elimination of so-called "drag";
(3) High conveying capacity with an extremely light-weight structure;
(4) Rugged, yet low-cost construction, due to use of non-critical materials;
(5) Readily convertible from bearingless gravity type to power-driven type;
(6) Capability of handling fragile articles of cargo without damage;
(7) When power-driven, equal distribution thereof to all roller components;
(8) Low slope requirements for gravity operation; low inerta required of moving parts; and
(9) Ease of assembly and replacement of components without the requirement of special tools for the purpose.

The foregoing and other objects and advantages of the present invention will be apparent from the following description and appended claims when considered in conjunction with the accompanying drawing forming a part of this specification wherein like reference characters designate corresponding parts in the several views.

In said drawing:

FIGURE 1 is a side elevation of the bearingless roller conveyor structure of the present invention, showing the endless motive-powered adaptation thereof;

FIGURE 2 is a fragmentary plan view of the conveyor structure of FIGURE 1;

FIGURE 3 is a transverse section taken substantially along the line 3—3 of FIGURE 2, looking in the direction of the arrows;

FIGURE 4 is an enlarged fragmentary sectional view taken substantially along the line 4—4 of FIGURE 2, looking in the direction of the arrows, and showing one pair of the non-metallic inflatable roller elements of the structure;

FIGURE 5 is a fragmentary plan view of a gravity type, single flight twin-roller version of the conveyor structure embodying the invention; and FIGURE 6 is an enlarged fragmentary section taken along line 6—6 of FIGURE 5, looking in the direction of the arrows.

Before explaining in detail the present invention, it is to be understood that the invention is not limited in its application to the details of construction and arrangement of parts illustrated in the accompanying drawing, since the invention is capable of other embodiments and of being practiced or carried out in various ways. It is to be understood also that the phraseology or terminology employed herein is for the purpose of description and not of limitation, and it is not intended to limit the invention claimed herein beyond the requirements of the prior art.

Referring now to FIGS. 1 through 4 of the drawing, one form of the convertible, motive-powered or gravity bearingless roller conveyor structure is shown as a whole at 9. It includes a framework and a roller-supporting bed or platform which has, in effect, two sections or parts 10 and 11 separated only by a central longitudinal portion 10a. This longitudinally extending roller-supporting bed or platform 10, 11 provides a support and guide for the upper flight of dual or twin pairs of rollers, as well as a guide for the rollers of the lower flight. The frame and platform or bed 10, 11, as shown, are preferably supported in a substantially horizontal plane by spaced depending upright supporting standards or legs 12, two such being shown, although it will be appreciated that additional supporting standards may be provided for a conveyor structure of greater length than that shown.

As stated, the particular embodiment of the conveyor structure shown in FIGS. 1 through 4, is of the electric motor-driven type. To permit such, each pair of end-to-end, or twin axially aligned, rollers 13 and 14 is provided with a common 5-belt centrally disposed pulley 15, said pulley being mounted upon a hollow hub or connecting sleeve 13a which is preferably integral with, or at least secured to and located between, each pair of rollers 13 and 14, thus providing a complete twin-roller unit. Each pulley 15 has a central peripheral groove 16 which is provided for the reception of a common power-driven belt 17. Drive belt 17, as shown, derives its power from an electric motor 18, mounted upon a base 19 beneath and substantially midway of the ends of the platform 10, 11 and intermediate the upright supports 12. The electric motor is of sufficient capacity to drive the belt 17 at varying speeds. It has a drive pulley 20 mounted upon the motor shaft 21, and there is provided a pair of idler guide pulleys 22, 22 around which the endless drive belt 17 passes.

Each adjacent pair of roller hub-supported pulleys 15 is drivingly connected to the next pair of rollers, at the opposite sides thereof, by four independent belts. Outside belts 23, 23 engage the outside grooves 16a, 16a of the pulley 15 of a pair of rollers 13, 14, whereas a pair of inside parallel connecting belts 24, 24 engages the inner pair of pulley grooves 16b, 16b, see particularly FIGS. 2, 3 and 4 of the drawing. Thus, the various parallel twin-roller and pulley units throughout the length of the supporting bed 10, 11 of the structure are all connected together so that rotation or movement, either by gravity or by power, of one pair of roller-connected pulleys 15 will serve to drive adjacent pairs of pulleys on the opposite sides thereof, all at the same, or substantially the same, rate of speed.

The novel conveyor structure shown particularly in FIG. 1 may, if desired, be easily converted from the motor-driven type shown to a gravity-type by simply removing, or disconnecting the drive belt 17, while allowing the parallel pairs of belts 23, 23 and 24, 24 to remain in operative engagement with the peripheral grooves in their respective pairs of pulleys 15.

The rollers of each pair of tandem-like rollers 13, 14, connected in some fashion to their intermediate common pulley 15, is formed from some suitable non-metallic and preferably inflatable material. To permit the inflation of each of the pairs of rollers, one thereof, namely, roller 13, is provided, for example, in its outer end with an inflating valve 25 of conventional structure. Since the roller 13 is in communication with the roller 14 of each pair through the medium of the tubular hub structure 13a, the inflation of roller 13 will simultaneously effect the inflation of its companion coaxial roller 14.

The air pressure of the dual rollers will, of course, be governed in accordance with the character and weight of the material to be handled by the conveyor, greater pressure being required for heavier material and a lower pressure, at least in some instances, for conveyed material of lighter weight.

With reference to FIG. 3, it will be seen that the bed or platform 10, 11 has its top and bottom surfaces concavely-formed or shaped so as to conform generally to the shape of each of the rollers 13, 14 of a pair or unit. In other words, the top surface of section 10 of the bed is concavely-curved at 26 at its inner end and similarly curved at 27, at its outer end. The top surface of section 11 of said bed is similarly curved at 28 and 29. It will be noted further that the same curvatures are present in the bottom surfaces of the bed sections 10 and 11, as represented at 30, 31 for section 10, and at 32, 33 for section 11, see FIG. 3. Therefore, the upper and lower flights of rotatable dual rollers 13, 14 are all guided and maintained in alignment by the bed sections 10, 11. Whereas, due to the weight of the dual rollers 13, 14, they may, during their travel in the lower flight, move out of full contact with the lower or under surface of the bed 10, 11, the spaced curved formations of said bed sections will, however, serve to guide the convexly-curved end portions of the rollers of each pair.

Referring now to FIGS. 5 and 6 of the drawing, there is shown a fragmentary plan view and an enlarged fragmentary sectional view of a gravity-type, or version, of the bearingless roller conveyor structure of the present invention. In this form of the invention, there is shown merely a single flight of twin roller and central pulley units, consisting of a plurality of such units connected together in pairs so that when rotated, or revolved, by the gravitational engagement of articles moved over the conveyor, said movement is imparted from one dual roller unit to adjacent dual roller units. In the present form of the invention, a table or bed, similar to that of the preceding form, is employed. The present bed comprises sections or halves 100 and 111 which are concavely-curved at points adjacent the opposite ends of the dual roller units 130, 140, and thus serve as alignment means and guides for said rollers. As in the preceding form, rollers 130, 140 are interconnected by a tubular hub member 130a which carries a 4-groove pulley 150. One of each pair of rollers 130, 140 is provided with a common inflating valve assembly 250. Air applied to the valve 250 of the roller 130 will pass through tubular hub 130a and into the other roller 140 of the pair, to duly inflate the same.

Hub member 150 of each of the pairs of rollers 130, 140, as shown, has four belt-receiving grooves 160a and 160b, the grooves 160a being the outside pair and the grooves 160b being the inside pair, see FIG. 6. These hubs are interconnected in pairs by outer belts 230, 230 which travel in grooves 160a, 160a and by a pair of inner belts 240, 240 which are adapted to travel in the inner pair of pulley grooves, 160b, 160b, see FIG. 5.

The rollers 130, 140 of each twin roller unit may be formed from any suitable non-metallic material, such as plastic, rubber, synthetic rubber, or the like. The hubs 150 may likewise be formed of some suitable non-metallic material, such as plastic, by a conventional molding process.

Whereas, the conveyor structures illustrated have preformed beds 10, 11, 100, and 111 for the purpose of guidingly supporting the various twin roller units, other means may be employed to maintain these twin roller units in line during rotation, either by motive-power-drive means, or by gravitational engagement of material or articles which are placed upon them.

I claim:

1. In a convertible motive-powered or gravity bearingless roller conveyor structure, the combination of a substantially horizontal longitudinally extending roller-supporting bed, means depending from said bed for supporting it, a plurality of bed-contacting roller units each including a pair of coaxially aligned intercommunicating inflatable rollers, the rollers of each pair having therebetween a hollow hub-like pulley common to both rollers, each pair of rollers and their common hub-like pulley providing a complete roller unit of the conveyor structure, said pulley being receptive of means for rotating the unit, and valve means carried by the unit for inflating both rollers of said unit.

2. In a convertible motive-powered or gravity bearingless roller conveyor structure of the bed-supported roller type, the combination of a substantially horizontal longitudinally extending roller-supporting bed, means depending from said bed for supporting it, a plurality of bed-contacting roller units each including a pair of coaxially aligned intercommunicating inflatable rollers, the rollers of each pair having disposed therebetween a hollow molded plastic hub and pulley assembly common to both rollers, each pair of rollers and their common hub and pulley assembly providing a complete unit of the conveyor structure, the peripheral portion of said pulley assembly having a series of annular grooves formed therein, belts engaging in said grooves and interconnecting the pulleys of two adjacent roller and pulley units, and valve means associated with one roller of each pair for simultaneously inflating both rollers of the pair.

3. In a convertible motive-powered or gravity bearingless roller conveyor structure of the bed-supported roller type, the combination of a substantially horizontal longitudinally extending roller-supporting bed, means depending from said bed for supporting it, a plurality of bed-engaging roller units each including a pair of coaxially aligned inflatable rollers, the rollers of each pair being in communication and having therebetween a hollow hub-like pulley common to both rollers, each pair of rollers and their common hub-like pulley providing a complete unit of the conveyor structure, said pulley being receptive of means for rotating the unit, and valve means carried by the unit for inflating both rollers of said unit, said roller-supporting bed being formed and shaped so as to conform to the contour of the pairs of rollers and maintain them in proper positions during the rotative movement thereof.

4. In a convertible motive-powered or gravity bearingless roller conveyor structure of the bed-supported roller type, the combination of a substantially horizontal longitudinally extending roller-supporting bed, means depending from said bed for supporting it, a plurality of roller units each including a pair of coaxially aligned inflatable rollers, the rollers of each pair being in communication and having therebetween a hollow hub-like pulley common to both rollers, each pair of rollers and their common hub-like pulley providing a complete twin-roller unit of the conveyor structure, said pulley being receptive of means for rotating the unit, and valve means carried by the unit for inflating both rollers of said unit, said roller-supporting bed having means cooperating with the several pairs of rollers to maintain them in alignment during rotation thereof.

5. In a motive-powered bearingless roller conveyor structure, the combination of a substantially horizontal longitudinally extending roller-supporting bed, means depending from said bed for supporting it, a plurality of roller units each including a pair of coaxially aligned intercommunicating inflatable rollers, the rollers of each pair having between their adjacent ends a hollow molded plastic pulley common to both rollers, each pair of rollers and their common hollow pulley providing a complete twin-roller unit of the conveyor structure, the peripheral portion of said hollow pulley having a series of annular grooves formed therein, belts engaging in said grooves and interconnecting the pulleys of two adjacent roller and pulley units, means on the upper and lower surfaces of the bed for maintaining the several complete roller units in proper alignment during rotative action thereof, valve means associated with one roller of each pair for simultaneously inflating both rollers of the pair and a power-driven belt for driving all of said twin-roller units.

6. In a convertible gravity bearingless roller conveyor structure, the combination of a substantially horizontal longitudinally extending roller-supporting bed, means depending from said bed for supporting it, a plurality of roller units each including a pair of coaxially aligned inflatable rollers, the rollers of each pair being in communication by a hollow hub-like pulley assembly located therebetween and being common to both rollers, each pair of rollers and their common hollow hub-like pulley assembly providing a complete roller unit of the conveyor structure, said pulley assembly being receptive of means for rotating the unit, and valve means carried by the unit for inflating both rollers of said unit, said bed being formed to provide pre-shaped longitudinal top and bottom supporting and guiding surfaces engaged by the several pairs of rollers, said surfaces being so shaped as to maintain the several roller units in alignment during operation of the roller conveyor structure.

7. In a convertible motive-powered or gravity bearingless roller conveyor structure, the combination of a substantially horizontal longitudinally extending roller-supporting bed, means depending from said bed for supporting it, a plurality of roller units each including a pair of coaxially aligned intercommunicating inflatable rollers, the rollers of each pair having therebetween a hollow hub-like pulley common to both rollers, each pair of rollers and their common hollow hub-like pulley providing a complete roller unit of the conveyor structure, said pulley being receptive of means for rotating the unit, valve means carried by each unit for inflating both rollers of the unit, and said bed comprising spaced parallel longitudinal upper and lower pre-shaped surfaces with which the several pairs of rollers contact to align and guide them during use of the roller conveyor structure.

8. In a convertible bearingless roller conveyor structure of the bed-supported roller type, the combination of a substantially horizontal longitudinally extending roller-supporting bed, spaced upright means for supporting it in a substantially horizontal plane, a plurality of roller units unattached to said bed and each including a pair of coaxially aligned intercommunicating non-metallic inflatable rollers having therebetween a hollow hub and pulley assembly common to both rollers to provide a twin-roller unit, the pulley of said assembly having five annular peripheral grooves formed thereon, separate pairs of belts interconnecting adjacent pairs of rollers by engagement with four of said grooves, a power-driven belt engaging the fifth groove of each of said pulleys, and motive-power means for driving said last-named belt to rotate all of said twin roller units and their interconnecting pairs of belts.

9. In a convertible motive-powered or gravity bearingless roller conveyor structure of the bed-supported roller type, the combination of a substantially horizontal longitudinally extending roller-supporting bed, means depending from said bed for supporting it, a plurality of roller units each including a pair of coaxially aligned inflatable rollers, a hollow hub-like pulley assembly common to both rollers and affording communication therebetween, the pulley of said assembly having five annular peripheral grooves formed thereon, pairs of belts interconnecting adjacent pairs of rollers by engagement with four of the grooves of each pulley, a power-driven belt engaging the fifth groove of each of said pulleys, and means for driving said last-named belt to rotate all of said roller units, one of the rollers of each pair having valve means for the simultaneous inflation of both rollers of the pair independent of all the rollers of the remaining roller units.

10. In a gravtiy bearingless roller conveyor structure of the bed-supported roller type, the combination of a substantially horizontal longitudinally extending roller-supporting bed, means depending from said bed for supporting it, a plurality of roller units each including a pair of coaxially aligned non-metallic hollow inflatable rollers, the rollers of each pair being in communication and having therebetween a hollow hub-like pulley common to both rollers, each pair of rollers and their common interposed hub-like pulley providing a complete roller unit of the conveyor structure, and said plurality of roller units together providing a single flight roller conveyor, each hollow hub-like pulley having four annular peripheral grooves, and a set of four endless belts engaging the four annular grooves of each of the adjacent pairs of roller units, whereby the rotation of one roller unit will transmit like movement to the other roller units.

11. In a gravity bearingless roller conveyor structure of the bed-supported roller type, the combination of a substantially horizontal longitudinally extending roller-supporting bed, means depending from said bed for supporting it, a plurality of roller units each including a pair of coaxially aligned hollow intercommunicating inflatable rollers, the rollers of each pair having therebetween a hollow hub-like pulley common to both rollers, each pair of rollers and their common hub-like pulley providing a complete roller unit of the conveyor structure, said plurality of roller units together providing a single flight roller conveyor, each hollow hub-like pulley having four annular peripheral grooves, and four endless belts engaging the four annular grooves of adjacent pairs of pulleys of the roller units, whereby the rotation of one roller unit will transmit like movement to the adjacent roller units, one roller of each unit having valve means common to the pair and permitting the inflation of both rollers of the pair.

References Cited in the file of this patent
UNITED STATES PATENTS

| | | |
|---|---|---|
| 871,340 | Hrdina | May 19, 1907 |
| 2,007,910 | Stephens | July 9, 1935 |
| 2,497,154 | Dailey et al. | Feb. 14, 1950 |